United States Patent
Van Stuijvenberg (10) Patent No.: US 9,232,806 B2
(45) Date of Patent: *Jan. 12, 2016

(54) METHOD AND INSTALLATION FOR KILLING POULTRY

(71) Applicant: Topkip B.V., Enschede (NL)

(72) Inventor: Wim Van Stuijvenberg, Tiel (NL)

(73) Assignee: Topkip B.V., Enschede (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,441

(22) Filed: Aug. 12, 2014

(65) Prior Publication Data

US 2015/0044954 A1 Feb. 12, 2015

Related U.S. Application Data (63) Continuation of application No. 13/885,809, filed as application No. PCT/EP2010/067764 on Nov. 18, 2010, now Pat. No. 8,814,636.

(51) Int. Cl.
| | | |
|---|---|---|
| *A22C 21/00* | (2006.01) | |
| *A22B 3/12* | (2006.01) | |
| *A22B 3/06* | (2006.01) | |
| *A22B 3/08* | (2006.01) | |
| *A22B 1/00* | (2006.01) | |

(52) U.S. Cl.
CPC ... *A22B 3/12* (2013.01); *A22B 1/00* (2013.01); *A22B 3/06* (2013.01); *A22B 3/086* (2013.01)

(58) Field of Classification Search
USPC ............ 452/52–54, 57–59, 63, 64, 67
See application file for complete search history.

(56) References Cited

U.S. PATENT DOCUMENTS

| | | |
|---|---|---|
| 2,103,288 A | 12/1937 | Hunt |
| 2,787,807 A | 4/1957 | Anderson et al. |
| 3,724,032 A | 4/1973 | Harben, Jr. |
| 4,574,427 A | 3/1986 | Harben, Jr. et al. |
| 5,326,307 A | 7/1994 | Bernardus et al. |
| 5,888,132 A | 3/1999 | Burnett |
| 5,954,573 A * | 9/1999 | Ohgaki et al. ............ 452/67 |
| 6,338,673 B2 | 1/2002 | Berry et al. |
| 6,899,613 B2 * | 5/2005 | van den Nieuwelaar et al. ............ 452/63 |
| 7,597,615 B2 | 10/2009 | van den Nieuwelaar et al. |
| 7,841,928 B2 | 11/2010 | Tseng et al. |
| 8,216,031 B2 | 7/2012 | Kleinsasser |
| 8,585,476 B2 | 11/2013 | Mullen |

FOREIGN PATENT DOCUMENTS

EP      2253218 A1    11/2010

* cited by examiner

*Primary Examiner* — Richard Price, Jr.
(74) *Attorney, Agent, or Firm* — The Webb Law Firm (57) ABSTRACT

An installation and method for halal killing poultry, such as chicken, turkey, duck and quail, includes the steps of: i) suspending the poultry with the poultry head down; ii) positioning the suspended poultry head via a V-shaped positioning element; and iii) killing the poultry near the suspended and positioned poultry head, optionally the poultry may be prestunned.

16 Claims, 6 Drawing Sheets

METHOD AND INSTALLATION FOR KILLING POULTRY

CROSS-REFERENCE TO RELATED APPLICATION

This application is a continuation of U.S. patent application Ser. No. 13/885,809, which was filed on May 16, 2013 (and which was accorded a 35 U.S.C. §371(c) date of Jul. 30, 2013), which is the U.S. national phase of PCT/EP2010/067764, filed Nov. 18, 2010, both of which are incorporated herein by reference.

BACKGROUND OF THE INVENTION

1. Field of the Invention

The present invention relates to a method and to an installation for killing poultry. The method and installation may be used for in an industrial manner and at high production rate halal killing of poultry.

2. Description of Related Art

In the process for obtaining halal poultry carcasses and poultry parts and meat it is of major importance that the poultry up to killing remain in a comfortable stage of good feeling. Stress is to be avoided as much as possible.

The prescribed method of ritual slaughter of all animals consists of a swift, deep transverse incision with a sharp knife across the neck, cutting through the windpipe, the food pipe, the vagus nerve jugular veins and carotid arteries of both sides but leaving the spinal cord intact. Furthermore it opens the circulatory system that is at high pressure to the air causing pressure to equalize and the blood pressure in the brain to fall to zero. As the brain requires a constant flow of blood under pressure for the animal to retain consciousness, anemia of the brain causes loss of awareness and perception.

If the poultry after being brought in a suspended position hanging downwardly from the legs, is not in a stage of good feeling and relaxation, it will be difficult if at all possible to correctly kill the animal. The animal will become stressed and will fiddle and sway around by waving with its wings. In such a situation killing will occur in an uncontrolled manner so that there is a real risk that an animal is not swiftly and properly killed. This is considered an unacceptable impact on correct animal treatment and an offence of animal integrity.

In addition, if poultry under stress its muscles will contract resulting in insufficient bleeding and debleeding. This will have an adverse effect on the ultimate quality of the obtained halal slaughtered poultry.

Furthermore, the suspended animal may be anxious in exploring the surroundings while suspended. This means that the animal is relatively movable with head and/or wings which makes electro-stunning relatively uncontrolled and often insufficient or not effective.

It is the object of the invention to provide a method according to the invention which method avoids to a major extent the above mentioned risks and disadvantages and substantially all animals are properly halal killed in a controlled manner and at high production rate. This method of the invention allows in a controlled manner halal killing of poultry at a minimum risk for inappropriate or even no killing.

SUMMARY OF THE INVENTION

This object of the invention is obtained with a method of the present invention for stunning poultry, such as chicken, turkey, duck and quail, comprising the steps of:

i) suspending the poultry with the poultry head down;

ii) positioning the suspended poultry head; and iii) killing the poultry near the suspended and positioned poultry head.

According to the method according to the present invention the poultry is first animal-by-animal suspended with the poultry head down. Such suspension may conventionally be carried out by suspending the poultry with its legs from a shackle comprising shackle elements for receiving the legs of the poultry. Being suspended the poultry by nature will raise its head in order to monitor the surroundings. This allows positioning of the suspended poultry head. Such positioning of the poultry head may be accomplished by confining the neck and preferably the upper body portion of the poultry within a positioning element. This results in a positioning of the poultry head which reaches out of such positioning element confining the animal neck and preferably upper body portion. With the poultry head positioned but exposed to the outside, the poultry head may be subsequently approached by the killing means. It is by the positioning of the poultry head that the exposed poultry head may be approached by the killing means for in a controlled and reliable manner halal killing the animal.

Preferably the killing occurs with a knife and comprises cutting of at least a neck blood vessel. The knife may be handled by a person, a robot, or mechanical means comprised by the slaughtering installation.

For a reliable cutting the animal neck and preferably automatically and at high speed it is preferred that the poultry neck is confined by a neck fork enclosing the poultry neck.

According to a preferred embodiment the wings of the suspended poultry are also confined during the positioning of the poultry head. Such confinement may be accomplished by introducing the upper body part of the poultry into a positioning element having substantially a beaker shape. By confining the wings of the poultry the positioning of the poultry head is improved because any fiddling of the animal body by waving its wings is avoided. Fiddling is further reduced when first contact is made by the confining means with the back of the poultry. This will result in a contraction of the wings.

According to another preferred embodiment the maintenance of the poultry animal during its suspension and subsequent positioning of the poultry head in a relaxed, comfortable and non-stress state is improved once the poultry is comforted by poultry breast contact. Generally, this is accomplished by allowing contact between the poultry breast and a breast guiding plate during transport in the suspended stage of the poultry, and subsequently during positioning of the poultry head by maintaining the contact between a guiding plate and the poultry breast, and/or by allowing contact of the poultry breast with the positioning element, preferably in the form of a positioning, converging beaker.

All these measures are contemplated and used in order to maintain the suspended poultry with its positioned head in a very comfortable stage without stress thereby minimizing any movement of the animal head, wings or other poultry body parts up to the controlled and swift killing.

Under circumstances it is allowed or even preferred that the poultry is (partially) stunned, thereby relaxing further the animal and have the animal unconscious or recovering from an unconscious state at the moment of killing. The stunning is preferably carried out by electro-stunning although other types of stunning, such as gas stunning, are also possible. Electro-stunning means that sufficient electrical power (dependent on current and voltage) is applied to the animal with the result that the animal is stunned and becomes unconscious. Electro-stunning may be carried out by using two electrodes making contact at distance with the animal head in order to allow for head-head stunning. Another option is to have one electrode making contact with the head and the other electrode making contact with the animal leg or legs. This is so-called head-leg-stunning. A further option is head-cloaca stunning in which case one electrode contacts the head and the other electrode contacts the cloaca. Of all three electro-stunning options the head-head electro-stunning is preferred because of the minimum distance in between the electrodes thereby allowing a precise and controlled electro stunning of in particular brain tissue. Furthermore, the electrical density is highest and no aberrations will occur by leaking electrical current to other body parts or via other body parts to the installation.

Optimal stunning for a predetermined period of time is obtained if preferably the head resistance of the poultry is measured and dependent on the measured resistance electrical current is applied, such as 100-400 mA, preferably 150-300 mA, and in particular 240-250 mA in view of European legislation.

In order to improve the electrical contact between the electrodes and the poultry, it is preferred that the poultry is wetted prior to electro-stunning. In case of head-head stunning it is preferred that the poultry head is wetted by nebulising water droplets on the poultry head at least at the locations where the stunning electrode(s) will make contact with the poultry head.

According to the method of the present invention it will be to a very high degree if not fully certain that each individual poultry animal will become unconscious after stunning and remains unconscious up to neck cutting for bleeding and subsequently bleeding to death.

Legislation requires that the poultry is immediately rendered unconscious after stunning and remains unconscious until death ensues. Known methods for stunning of poultry comprise an effort to stun the poultry animal after being suspended at their legs. This stunning may comprise electro-stunning by head stunning or cloaca stunning. Electro-stunning takes place by dipping the head of the poultry into a water bath. A water bath is a legally accepted method for electro-stunning. For proper stunning is required, that each individual poultry animal receives generally a minimum of about 100 mA to 400 mA. However, it appeared that the efficacy of the stunning is highly depended on the quality of the contact between the animal and the electrodes, the number of animals present in the water bath, and the frequency and voltage applied. The differences in contact quality are such that large numbers of animals are not properly stunned before neck cutting. The result is that the use of a water bath is strongly discouraged because it is impossible to guarantee that each animal is effectively stunned for a period of time sufficient for neck cutting and correctly killing of the poultry. The stunning means emit upon contact with the poultry head an electrical current into the poultry head. The electrical current is sufficient for stunning the poultry during a period of time sufficient for subsequent neck cutting and bleeding resulting in the death of the poultry animal while the poultry animal remains in an unconscious state up to death by bleeding.

Another aspect of the present invention relates to an installation for stunning poultry, such as chicken, turkey, duck and quail, comprising:
  i) means for suspending the poultry with the poultry head down;
  ii) means for positioning the suspended poultry head; and
  iii) means for killing the poultry near the suspended and positioned poultry head.

As indicated before the installation according to the present invention comprises means for suspending the poultry. The means for suspension of the poultry by hanging at its legs is a traditional poultry transportation device comprising shackles which comprise receiving elements for the poultry legs to be suspended. The position means for the poultry head are mounted and arranged such that the poultry head has a low degree of freedom after positioning and is generally in a very well controlled position which position is subsequently approached by the stunning means. The killing means comprise means for cutting a neck blood vessel.

For a reliable and controlled manner of killing it is preferred that the installation comprises a neck fork for confining the neck portion of the poultry.

Under circumstances it is preferred to have the poultry to be killed unconscious or recovering from an unconscious state. Thereto, it is preferred that the installation comprises at least one stunning electrode for applying an electrical current through the animal sufficient for stunning and making the animal unconscious.

According to a preferred embodiment an installation wherein the positioning means comprise a V-shaped positioning element for accommodating the neck of the poultry, and preferably the V-shaped positioning element is incorporated in a beaker, preferably a downwardly converging beaker. The positioning means comprise a positioning element which has a V-shaped positioning element in which the neck of the suspended poultry is inserted. Accordingly the poultry head reaches out of this V-shaped positioning element to one side whereas its body remains at the other side of the V-shaped positioning element. This brings the poultry head in a well-controlled position in relation to the stunning installation.

According to a preferred embodiment, the V-shaped positioning element is incorporated in a beaker in which will be accommodated the neck and upper body portion of the poultry with the head extending via the V-shaped positioning element outside the beaker. When the beaker is converging downwardly, this will result in a well-controlled confining of the animal, because the animal will be more intimately accommodated in the beaker while freely extending its poultry head out of the beaker. The head is with comfort hold in the desired position if preferably the V-shaped positioning element opens into a positioning throat confinement. The head appreciates resistance when moving upward but feels comfort in the wider throat confinement. According to a further preferred embodiment, the V-shaped positioning element is provided with a supporting element onto which the part of the neck which is extending out of the V-shaped positioning element may rest which further improves the positioning of the poultry head and increases the comfort of the poultry while being positioned. It is furthermore preferred when positioning arms hold the positioned head in place during for instance resistance measurement, wetting and/or stunning.

As indicated herein before, the stunning means preferably have the form of electro-stunning means for head-head stunning, head-leg stunning and/or head-cloaca stunning. In case of head-head stunning two electrodes will make contact with the head of the animal prior to emitting the electric current into the head. In case of head-leg stunning one electrode is contacting the head and the other electrode is connected to at least one leg and preferably to both legs. In the latter case the electrode is formed by the shackle. The shackle is electrically connected to the transportation chain forming the negative electrode. In case of head-cloaca stunning the other electrode is contacting the cloaca. Preferably, the stunning means comprise means for measuring the head resistance and means for adjusting the electrical power dependent on the measured head resistance, wherein preferably the electrode comprises electrode pins which are preferably ejectable form an electrode surface, when the surface is pressed against the poultry head.

According to a preferred embodiment of head-head stunning comprise the stunning means two electrodes to be placed against the head of the poultry, and carrying each a spring loaded electrode surface, preferably provided with electrode pins. This allows for an optimal contact with the poultry. Preferably the shape of the electrode surface is adjusted to the form and shape of the poultry head and has a rounded rear portion and a diverging front portion. Making it possible for optimal head contact even when the poultry has raised its head to some extent.

By measuring the resistance (or conductivity) optimal stunning is possible for each individual poultry. At highest conductivity it is generally possible to use less electrical power while still reaching the unconscious stage of the animal during a sufficient period of time. In such a case it is preferred that the installation comprises means for determining the electro-conductivity of each individual poultry head just before electro-stunning. This provides for an opportunity for improving the electro-conductivity if by measurement the electro-conductivity appears to be insufficiently low or to avoid that the stunned animal becomes conscious before neck cutting. In such a case that it is preferred that the installation comprises wetting means for wetting the head or possible leg and/or cloaca before contact is made with the electrode for electro-stunning. This wetting may be accomplished by water-dipping. However, it is preferred that wetting results from emitting a water droplet mist or water droplet spray from a nebuliser or sprayer which emits the water droplets towards and onto the respective sides on the animal head or other body part prior to electro-stunning.

The method according to the invention requires several steps prior to killing and optionally stunning. These steps comprise suspension, positioning and killing (optionally preceded by stunning). In order to have these three steps carried out in a synchronized manner, it is preferred that the suspension means, position means and killing means are incorporated in transport means which allow mutual synchronization. This is practically carried out by using a transportation means, such as in the form of one or more chains, to which make contact the suspension means, the means for positioning the V-shaped position element in relation to the animal body, and finally the killing means. Optionally, stunning means or stunning electrodes may also be included. When the positioning means and killing means are incorporated in one transportation vehicle which is connected to the transportation chain or chains also connected with the suspension means, then a very practical and reliable manner synchronization of the various means according to the invention is accomplished for industrial halal slaughtering of poultry in a reliable manner and at high speed.

Finally, having the animal neck cut for bleeding, this bleeding will occur with the animal not being in a stressed state, so that bleeding is optimal with limited or even substantially no muscle contraction and withholding of bleed in the dead animal. Accordingly, the carcass eventually obtained is of better quality. Accordingly the debleeded poultry has improved properties in relation to the degree of bleeding and in relation to the quality of the poultry meat in comparison to poultry which was not sufficiently handled and stunned prior to neck cutting.

BRIEF DESCRIPTION OF THE DRAWINGS

Mentioned and other features of the method, and installation according to the invention will be further illustrated by several embodiments which are given for information purposes only and are not intended to limit the invention to any extent. In relation to these embodiments reference will be made to the annexed figures of which.

DETAILED DESCRIPTION OF THE INVENTION

Figure 3:
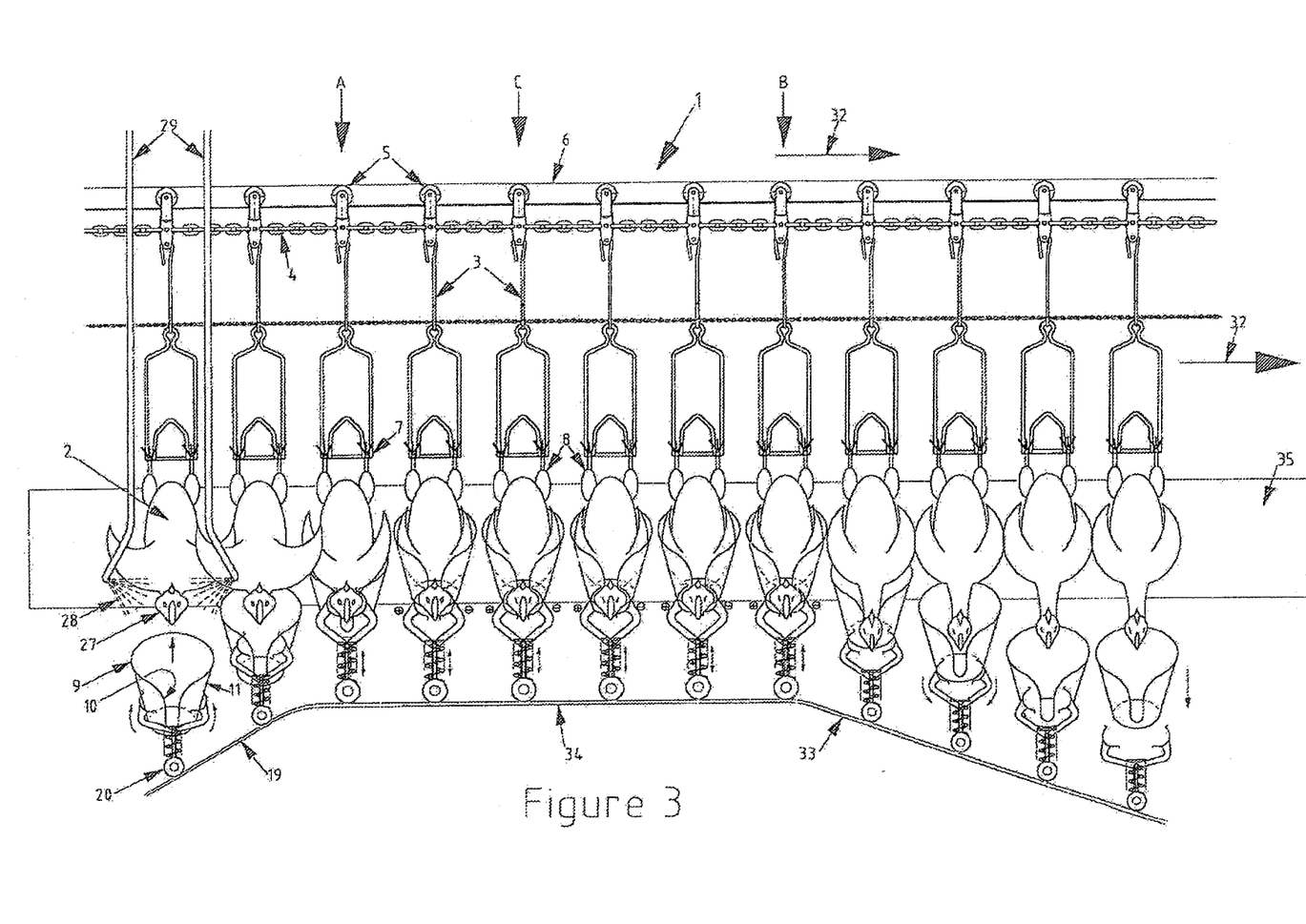
FIG. 3 is a front view of an installation according to the invention.

FIG. 3 shows an installation 1 for halal killing poultry 2 (in this case a chicken) after the poultry has been subjected to stunning. The installation 1 comprises shackles 3 connected to a chain 4 connected and via rollers 5 to a transport bar 6.

The shackles 3 comprise U-shaped receiving elements 7 for receiving the legs 8 of the poultry 2.

The installation 1 comprises further positioning means 9 in the form of a V-shaped positioning element 10 incorporated in a beaker 11 which is converging downwardly.

Figure 1:
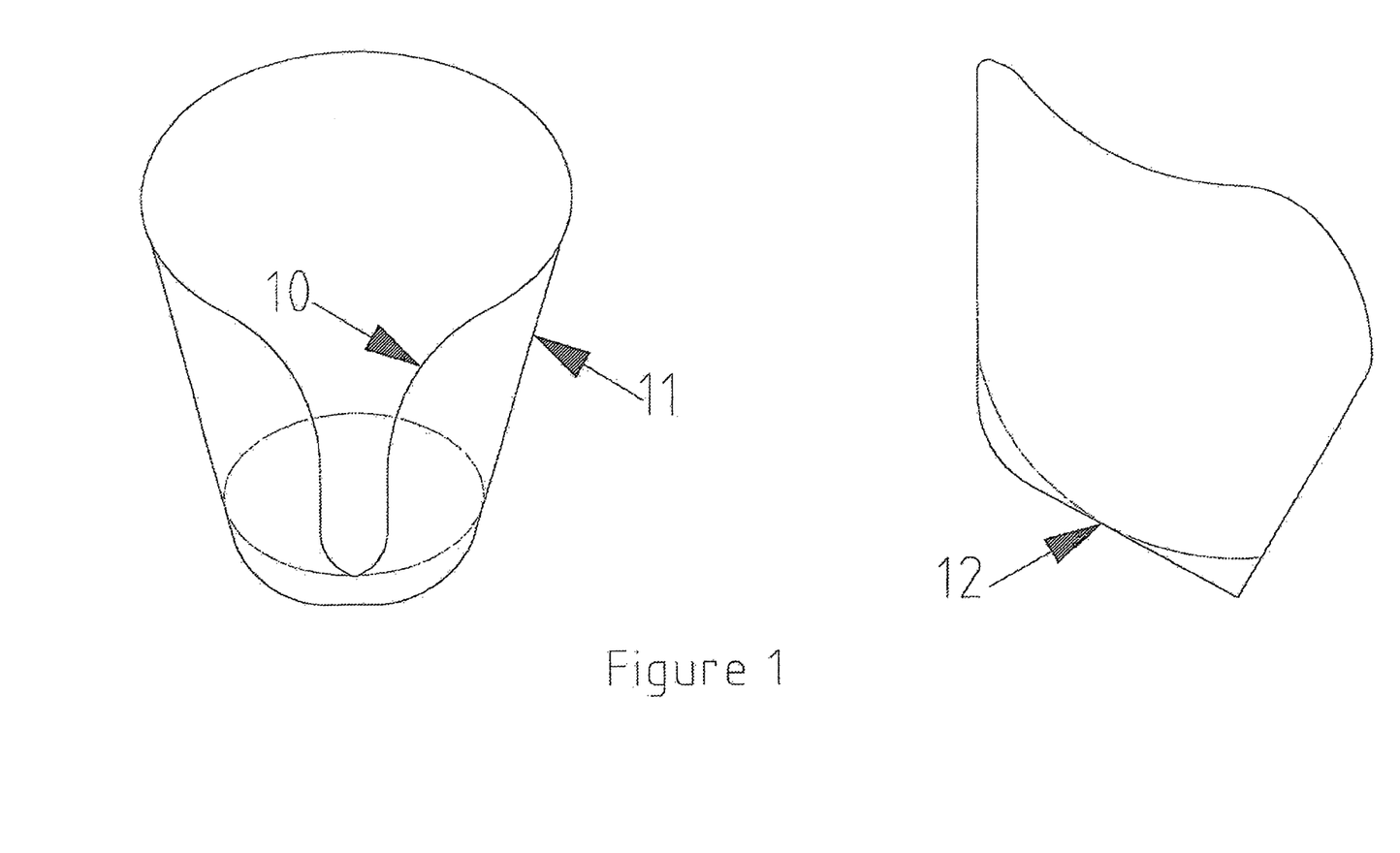
FIGS. 1 and 2 show a front view and side view of a beaker comprising a V-shaped positioning element according to the invention.

FIG. 1 shows a first embodiment of the beaker 11 with the V-shaped element or slot 10. The beaker has a bottom 12 which is in a slanted position. The form of the beaker 11, in particular the upper opening and the bottom 12 and the V-shaped slotted element 10 are such that the neck and the upper body portion and wings of the poultry 2 are comfortably and gently received and confined. In particular such that the breast of the poultry makes contact with the beaker 11 wall so that the poultry is subjected to a comfort providing sensation by wall contact.

Figure 2:
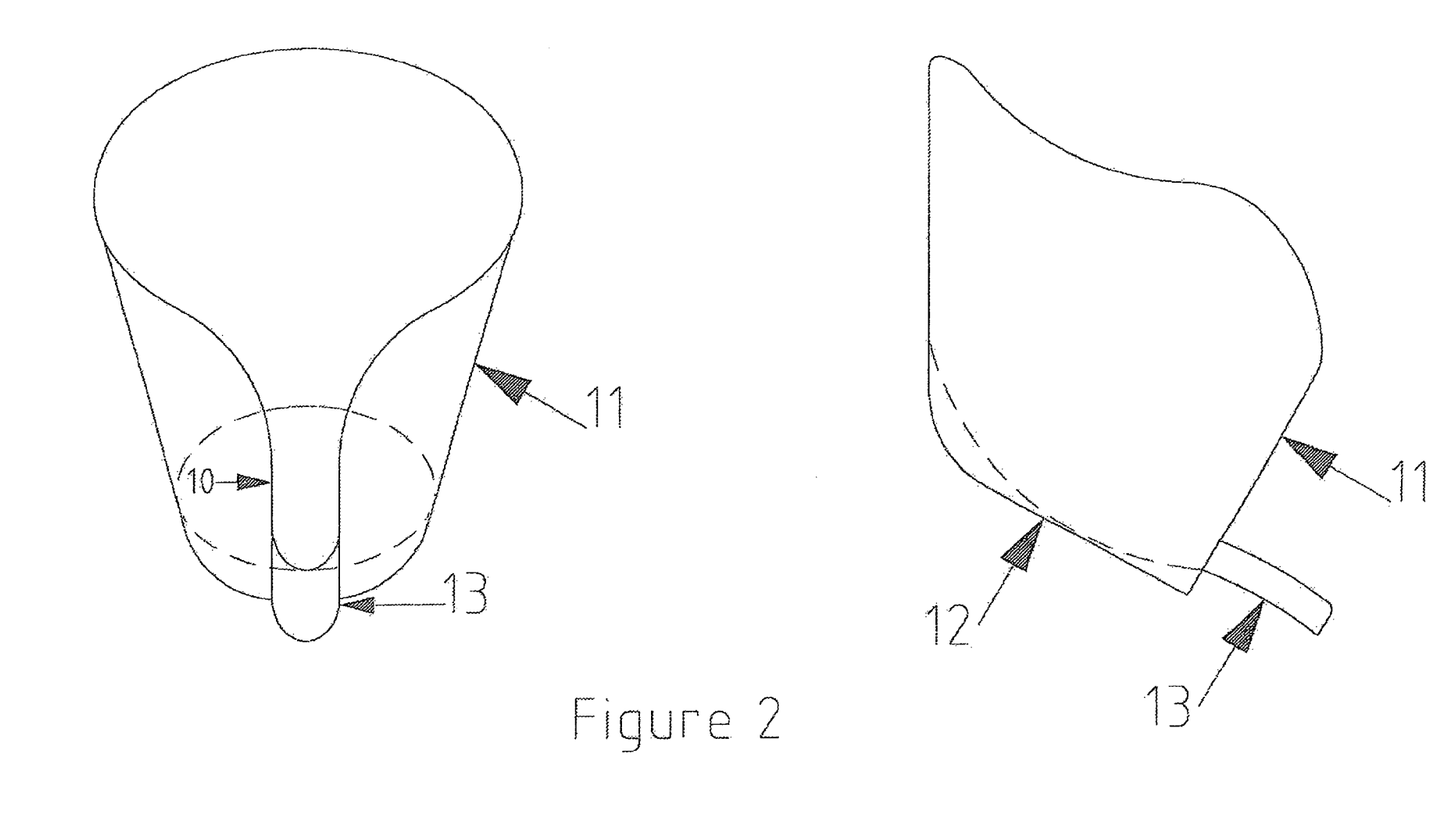

FIG. 2 shows an alternative to the beaker 11. In this case the beaker 11 is provided with a supporting element 13 extending outwardly from the lower region of the slotted element 10. The dimensions of the supporting element 13 are such that the part of the poultry neck that is extending out of the beaker 11 is supported thereby providing still more comfort to the suspended poultry animal.

Figure 4:
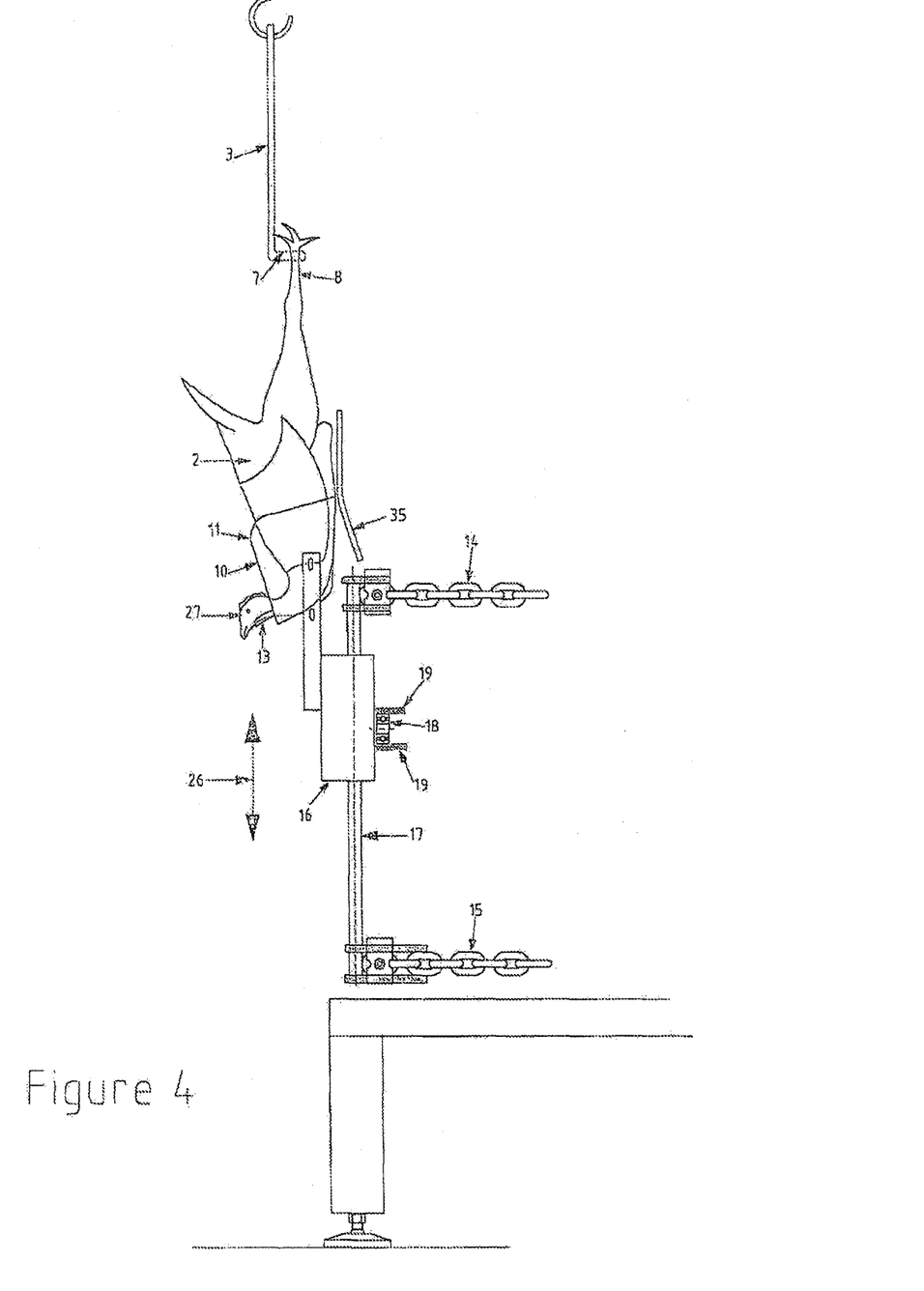
FIG. 4 is a side view of a part of the installation shown in FIG. 3.

As shown in FIG. 4, the beaker 11 is carried by a slide block 16 which is slidable over two parallel bars 17 connected to two chains 14 and 15 which are part of the transportation means also comprising the chain 4. The slide block 16 slides over the bars 17 under the action of a rider 18 rolling over and between two pairs of rider strips 19 via the rider wheels 20.

Returning to FIG. 3, it is shown that the poultry 2 suspended from the shackle 3 is first exposed to a water spray 28 emitted from spray tubes 29. Accordingly, the head 27 is wetted and thereby providing for each poultry head substantially the same electro-conductivity.

The transportation chains 4, 14 and 15 move in a synchronized manner the shackles 3 and the beakers 11 towards position A. The wheels 20 roll over and between the strips 19 which are having an inclined form so that the beaker 11 moves towards the suspended chicken 2 whereby the upper body and wings of the chicken 2 are received and confined in the beaker 11 with the head 27 extending through the V-shaped positioning element 10 with part of the neck. Moving towards position A the electrode blades 30 of the stunning means 23 make contact with the positioned wetted head 27 of the poultry. The electrode blades 30 are connected via non-shown electrode cables to a source for electrode power. The blades 30 are connected to the levers 24 via an insulation block 31.

In position C in FIG. 3 a controlled amount of electrical power is emitted from the electrode blades 30 into the head of the chicken 2 which is thereby stunned.

Directly after stunning a neck fork 36 is moved upwardly in to a position between the head and the body of the poultry 2. The positioned and confined poultry neck is then cut with a knife 37. The knife 37 follows a controlled movement such that a swift, deep transverse incision is made across the neck, cutting through the windpipe, the food pipe, the vagus nerve jugular veins and carotid arteries of both sides but leaving the spinal cord intact. This movement is guided by not shown mechanical guiding means.

Thereafter, the transportation means transport further following the arrow 32. The wheels 20 follow the declined part 33 of the strips 19 so that the electrode blades 30 are removed from the unconscious head of the chicken and the beaker is retracted. The horizontal part 34 of the strips 19 is such that during transportation time is available for contacting with the electrode blades 30 with the head 27 of the chicken for electro-stunning, and for halal neck cutting while having the head and the neck of the unconscious chicken in a well-positioned state. Due to the head-head electro-stunning using two electrode blades 30 the control of the applied electrical power, voltage and current is such that in a well-controlled manner via the positioned poultry head electro-stunning is effected and the risk for insufficient stunning is almost reduced to zero.

Figure 5:
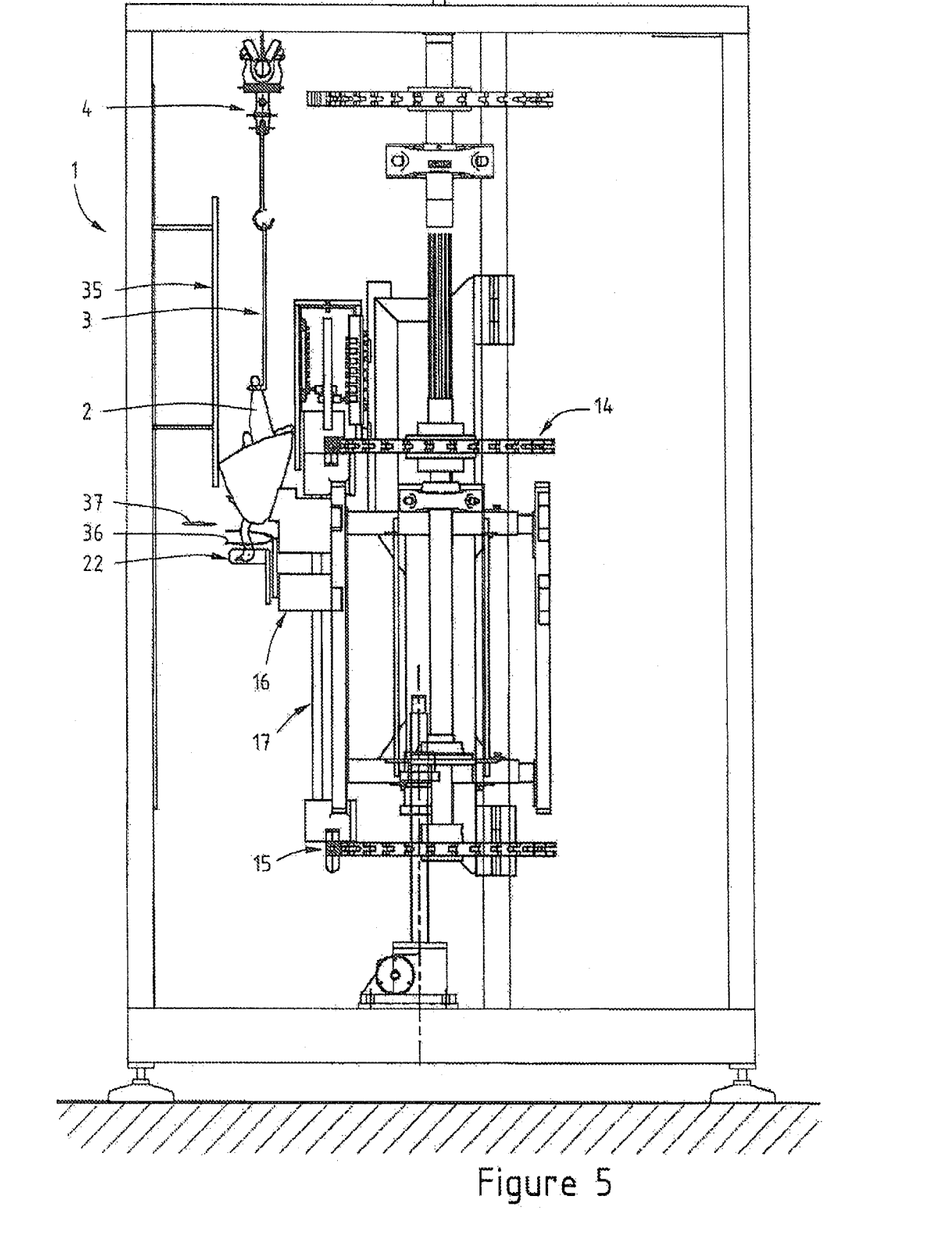
FIG. 5 is a side view perspective view as of position B shown in FIG. 3.
Figure 6:
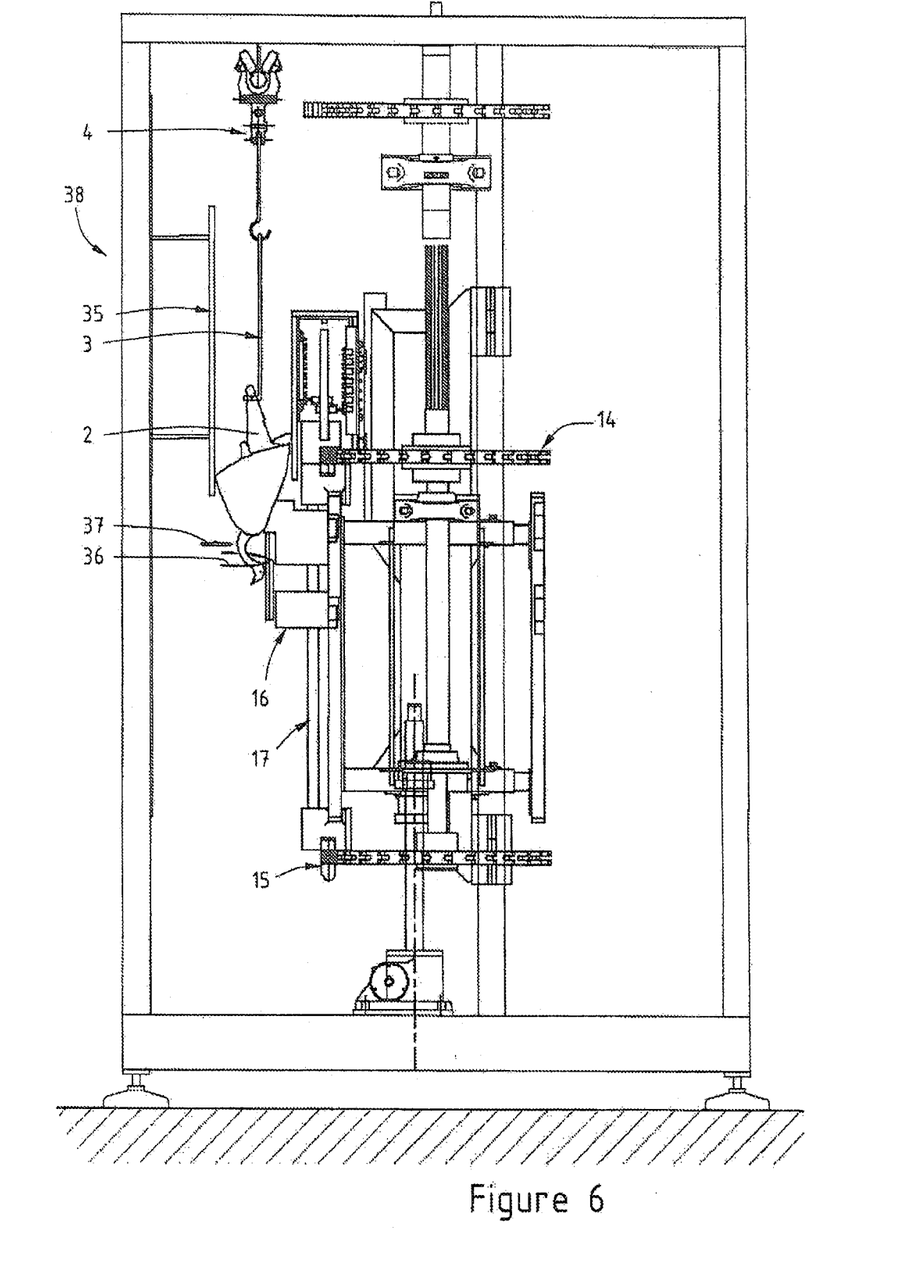
FIG. 6 is an alternative of the embodiment shown in FIG. 5.

FIG. 6 shows an alternative installation 38 of the installation 1 and method illustrated in FIG. 5. In the installation 38 shown in FIG. 6, the poultry is not stunned before halal killing the poultry 2. Thus, the stunning means are either absent or not used for stunning but may be used for positioning, or not used at all. As of position A in FIG. 3, a neck fork 36 is moved upwardly and positioned between the head and body of the poultry 2. Thereby, leaving space for halal killing of the poultry 2. In this case the killing is accomplished by manually making a swift, deep transverse incision with a sharp knife 37 across the neck, cutting through the windpipe, the food pipe, the vagus nerve jugular veins and carotid arteries of both sides but leaving the spinal cord intact. In the alternative the halal killing could be carried out mechanically as described in relation to FIG. 5.

Having read the full description of both installations 1 and 38 according to the invention, the skilled person will appreciate, that by positioning the neck of the suspended poultry in the V-shaped positioning element which could be incorporated in the beaker 11, the head of the suspended poultry is positioned but still approachable in a controlled and reliable manner for halal killing the poultry. Optionally, with prior stunning so that an unconscious poultry is killed. The movement of the beaker stunning means and suspending means is synchronized such that in a gentle manner the suspended poultry, such a chicken, feels comfortable up to killing with optional prior the enclosure by the electro-stunning means and the application of electrical power via the stunning means. In an alternative the electro-stunning means may be used for positioning the poultry head only. All takes place in a controlled and well-defined manner such that killing and optional prior electro-stunning is carried out in a reliable manner so that halal killing of the animal may be carried out in an industrial manner and a high production rate of 1000 to 15000 poultry animals per hour. This way the animal appreciates hardly any invasive or scaring action or movement up to halal killing.

The invention claimed is:

1. A method for killing poultry, such as chicken, turkey, duck and quail, comprising the steps of:
    i) suspending the poultry with the poultry head down;
    ii) positioning the suspended poultry head via a V-shaped positioning element for accommodating the neck of the poultry; and
    iii) killing the poultry near the suspended and positioned poultry head.

2. The method as claimed in claim 1, wherein the killing comprises cutting a neck blood vessel.

3. The method as claimed in claim 1, wherein the poultry neck is confined by a neck fork.

4. The method as claimed in claim 1, wherein wings of the suspended poultry are confined.

5. The method as claimed in claim 1, wherein the wings of the poultry are confined during the positioning of the suspended poultry head.

6. The method of claim 4, further comprising the step of comforting the poultry via poultry breast contact and/or contacting the back side of the poultry.

7. The method as claimed in claim 1, wherein the poultry prior to killing is stunned, such as head-head stunning, head-leg stunning and/or head-cloaca stunning.

8. The method of claim 1, wherein the poultry is stunned prior to killing by electro stunning, dependent on the electro conductivity of the poultry.

9. The method of claim 8, wherein the head of the poultry is wetted prior to electro stunning.

10. An installation for killing poultry, such as chicken, turkey, duck and quail, comprising:
    i) means for suspending the poultry with the poultry head down;
    ii) means for positioning the suspended poultry head; and
    iii) means for killing the poultry near the suspended and positioned poultry head, wherein the positioning means comprise a V-shaped positioning element for accommodating the neck of the poultry.

11. The installation as claimed in claim 10, wherein the killing means comprise means for cutting a neck blood vessel.

12. The installation of claim 11, wherein the means for stunning the suspended poultry is an electro stunning means.

13. The installation as claimed in claim 10, further comprising a neck fork for confining the neck of the poultry.

14. The installation as claimed in claim 10, wherein the V-shaped positioning element opens into a positioning throat confinement.

15. The installation as claimed in claim 10, further comprising means for stunning the suspended poultry, such as head-head stunning, head-leg stunning and/or head-cloaca stunning.

16. The installation of claim 10, wherein the V-shaped positioning element is incorporated in a beaker, such as a downwardly converging beaker.

* * * * *